Feb. 19, 1946.  J. F. BUFFENBARGER  2,395,247
BIRD FIGURE AND THE LIKE
Filed Aug. 5, 1943  3 Sheets-Sheet 2

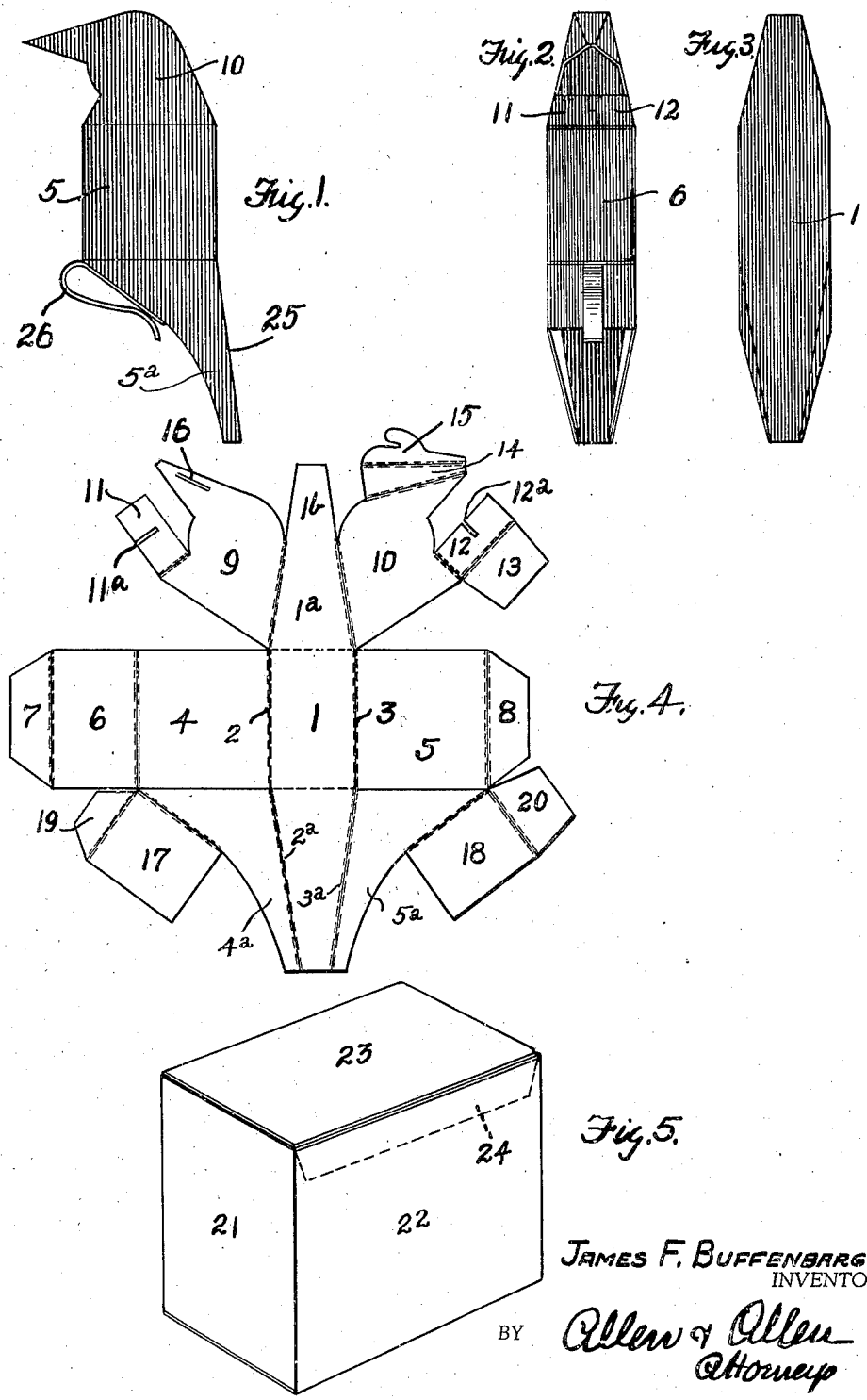

JAMES F. BUFFENBARGER.
INVENTOR.

BY Allen & Allen
Attorney

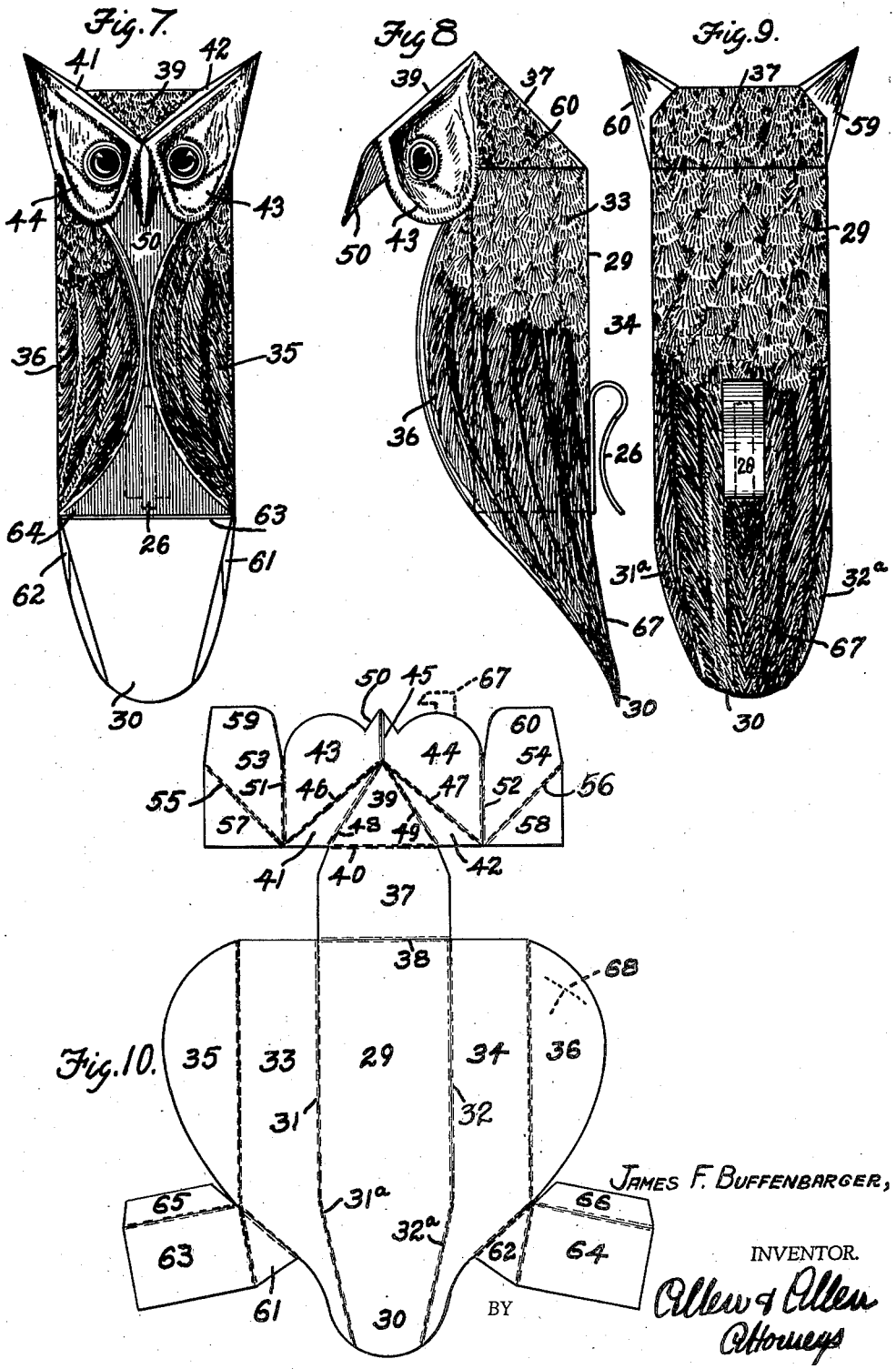

Patented Feb. 19, 1946

2,395,247

UNITED STATES PATENT OFFICE 2,395,247

BIRD FIGURE AND THE LIKE

James F. Buffenbarger, Middletown, Ohio, assignor to The Gardner-Richardson Company, Middletown, Ohio, a corporation of Ohio Application August 5, 1943, Serial No. 497,479

15 Claims. (Cl. 46—157)

My invention has for its principal object the provision of blanks of boxboard or the like which may be associated with used or empty containers to produce structures resembling birds or other life forms.

The provision of a use for empty cartons is a matter offering considerable commercial opportunity. By way of a single example of utility in the structures of my invention, it may be pointed out that shotgun shells are shipped in relatively small containers or cartons. Almost invariably these cartons are emptied by the purchaser prior to a hunting trip, and the shells themselves are filed into a belt or into the pockets of a hunting coat. There has hitherto been no use for the cartons thus emptied.

By my invention, and as one of its objects, a printed, colored or plain boxboard blank may be sold or otherwise furnished to the purchaser of cartons of shotgun shells. After he empties his cartons, he can then fold this blank and associate it with one or more of the emptied cartons, thus forming a bird or other figure, usable as a decoy. The cartons themselves, before such associations, may be filled with sand or earth to give the combined structure weight and stability. In the ensuing specification I shall describe two exemplary forms of my invention, one being an owl and the other a crow, both suitable for association with shotgun shell cartons and both suitable for use as decoys in hunting or ridding farmlands of pests.

It will be understood that this particular field does not exhaust the utility of my invention. By following the teachings herein a wide variety of interesting and attractive life forms may be made suitable for association with cartons, filled or unfilled, and holding many different types of products. Thus my invention finds utility in the fields of merchandising and display, for decoration, and for use as children's toys. Also, it will be evident that certain forms of my invention need not be built around used or unused cartons but can be made as self-sustaining structures.

Other objects of my invention have to do with the solution of the problems involved in making figures of odd and complicated shapes from single cut and scored blanks of boxboard and the like.

These and other objects of my invention which will be set forth hereinafter or will be apparent to one skilled in the art upon reading these specifications I accomplish by that certain construction and arrangement of parts of which I shall now describe the aforesaid exemplary embodiments, the essential aspects of novelty being set forth in the appended claims. Reference is now made to the drawings wherein:

Figure 1 is a side elevational view of the figure of a crow formed in accordance with my invention.

Figure 2 is a front elevation thereof.

Figure 3 is a rear elevation.

Figure 4 is a plan view of a cut and scored blank of boxboard from which the crow figure may be made.

Figure 5 is a perspective view of a carton which may be employed in rigidifying the body of the figure.

Figure 7 is a front elevation of the figure of an owl.

Figure 8 is a side elevation thereof.

Figure 9 is the rear elevation.

Figure 10 is a plan view of a cut and scored blank of boxboard or the like for forming the owl figure.

Figure 6:
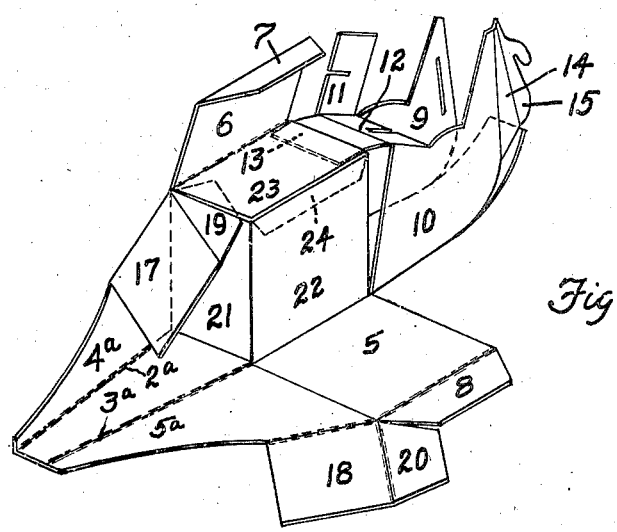
Figure 6 is a perspective view showing the structure in process of assembly.

In Figure 4 I have shown a unitary blank comprising a number of wall portions articulated together. There is a back wall portion 1 demarked by parallel score lines 2 and 3; but it will be noted that where the back portion 1 continues downwardly to form a tail portion, these score lines converge as at 2a and 3a for a purpose which will hereinafter be set forth. The upper end of the back wall portion is provided with an integral neck extension 1a and this terminates in an upwardly extending tongue 1b. These latter members are of tapering conformation. The neck and tail extensions may be articulated to the back wall by score lines as shown.

To each side of the back wall portion I articulate side body wall portions 4 and 5 which terminate downwardly in tail extensions 4a and 5a, preferably severed from the side body wall portions as shown. To one of the side wall portions I articulate a front wall portion 6. To this wall portion and to the opposite side wall portion 5 I articulate tuck flaps, which are indicated at 7 and 8.

To the sides of the neck portion 1a, I articulate, along slanting score lines, members 9 and 10 which form the sides of the head of the figure and, in this instance, are shaped to the desired head profile. To each of these members, along score lines having the desired angularity I articulate collar-like flap members 11 and 12, the purpose of which is to hold the lower part of the head in erected condition. These members interlock and are provided with oppositely directed slots 11a and 12a for this purpose. The collar member 12 is provided with a tuck flap 13 for a purpose hereinafter set forth. Articulated to one of the side head members, the member 10, I provide a top head wall 14 and a locking flap 15 having a tongue which will engage and lock in a slot 16 formed in the other side head wall member.

To the under portion of each of the body side walls 4 and 5 I articulate walls 17 and 18 to form an under part of the figure, and each of these walls is provided with a tuck flap 19 or 20.

In Figure 5 I have shown in perspective an ordinary tuck end carton having a tubular body portion with a pair of end walls, one of which is shown at 21 and a pair of side walls, one of which is shown at 22. This carton has a top wall 23 articulated to one of the side walls and provided with a tuck flap 24. The carton may have a similar construction at its bottom. Such a carton may be employed to give rigidity and stiffness to my structure, and when such use is intended, the proportions of the several walls of the blank of Figure 4 will be appropriately determined. It will be evident that tuck flaps of an outer structure may be engaged with the carton of Figure 5. Considering the top of it, a tuck flap may be passed downwardly alongside of the tuck 24. Other tuck flaps may be passed horizontally inwardly beneath the side edges of the top wall 23.

As shown in Figure 6, the carton of Figure 5 may be placed on the back wall 1. The side walls 4 and 5 may be made to conform to the side walls of the carton and the tuck flaps 7 and 8 may both be passed downwardly inside of the wall 22 of the carton and paralleling the carton tuck flap 24. This will erect the body of the crow.

The collar portions 11 and 12 may be engaged as shown in Figure 2, and the tuck 13 on the portion 12 may be passed downwardly beneath the top wall 23 of the carton of Figure 5. The tongue 15b may be bent over in an arcuate shape and the head top member 14 may be bent over on top of it, the locking flap 15 now lying along the opposite head side wall 9 with the locking tongue engaged in the slot 16. This fully erects and rigidifies the head portion of the figure.

The bending of the tail portions 4a and 5a of the side walls along the tapered score lines 2a and 3a will result in an outward extension of the tail, as indicated at 25 in Figure 1, the tail extension of the back wall now no longer lying in the same plane as the back wall 1 of my blank.

The walls 17 and 18 are individually bent over along their score lines with the insertion of the tuck flaps 19 and 20 upwardly beneath the top wall 23 of the carton of Figure 5. This completes the erection of the figure, which now appears as in Figures 1, 2 and 3. The walls 17 and 18 lie together in parallelism forming a slanting under part of the bird figure. Separating the parts 4 and 5 from the parts 4a and 5a respectively by cut lines as shown facilitates the insertion of the tuck flaps 19 and 20. By rounding the outer corners of these flaps it is possible to omit the said cut lines.

If desired, a metal clip 26 may be attached to these walls for the purpose of holding the figure on a support, such as the limb of a tree, a fence rail, a post, or the like. The boxboard from which the blank of Figure 4 is made will preferably be colored. It may be elaborately printed; but in the case of the crow it is usually sufficient for decoy purposes simply to make the blank of Figure 4 from boxboard having a black surface.

The figure of an owl is illustrated in Figures 7 to 11 inclusive, and is constructed on substantially the same principles, with due variations for the differences in shape between the figures. Whereas in the case of the crow it would be possible to set up the figure without the carton of Figure 5 by providing for a locking engagement of the flap 7, say, with the side wall 5, in the exemplary owl embodiment, I have illustrated a structure of such character that the inner reinforcement is not wholly covered by the walls of the figure. The inner reinforcement in this instance may consist of two shotgun shell boxes or cartons shown respectively at 27 and 28 in Figure 11. The blank, as shown in Figure 10, again has a back wall 29 terminating downwardly in a tail extension 30. The back wall proper is demarked by parallel score lines 31 and 32 while in the tail extension these score lines converge as at 31a and 32a. The structure is provided with side walls 33 and 34 articulated to the back wall, and these in turn have articulated to them front flaps 35 and 36 which in this instance have an arcuate configuration and are not intended to lie snugly against the inner cartons 27 and 28, but are intended to lie at an angle thereto to give roundness to the body of the figure as viewed in side perspective. This will be apparent in Figure 8.

The blank of Figure 10 has a neck portion 37 which may be articulated to the back wall 29 along a score line 38. A top head wall portion 39 of substantially triangular configuration is articulated to the neck portion along a score line 40. Sidewise disposed triangular portions 41 and 42 are articulated to the head top portion 39 and, when the figure is fully erected, will form the tops of the "ears" of the owl. At the sides of the members 41 and 42 I articulate front face or cheek portions 43 and 44 for the figure. These portions are articulated together along a score line 45; and this score line, together with score lines 46 and 47 demarking the front face portions and score lines 48 and 49 demarking the top ear portions from the top head portion 39 meet in a point as shown. The side head portions are contoured to form a beak portion as shown at 50.

To the sides of the side head portions 43 and 44, and along score lines 51 and 52 I articulate side neck portions 53 and 54. Diagonal score lines 55 and 56 demark from the last mentioned portions rear ear portions 57 and 58. Each of the side neck portions 53 and 54 are provided with tucks 59 or 60, as shown.

To the under parts of the body side walls 33 and 34, by means of appropriately slanted score lines, I articulate triangular members 61 and 62. To each of these an under wall portion 63 or 64 is articulated, and each of these under wall portions is provided with a tuck flap 65 or 66.

In setting up the figure from the blank just described, the cartons 27 and 28 are appropriately arranged on the blank back wall 29 and the side walls 33 and 34 are brought up against the sides of the carton assembly, with the front flaps 35 and 36 partially bent over. The bottom walls 63 and 64 are folded as partially shown in Figure 11, the triangular parts 61 and 62 permitting the bottom walls to be brought into parallelism with the lower end wall of the carton assembly. The tuck flaps 65 and 66 are tucked into one of the cartons beneath the front wall 22 thereof and paralleling its tuck flap 24. This will serve to maintain the body of the figure in erected form. The bending of the side walls 33 and 34 along the converging score lines 31a and 32a again provides the slanting outward configuration of the tail illustrated at 67 in Figure 8.

Figure 11:
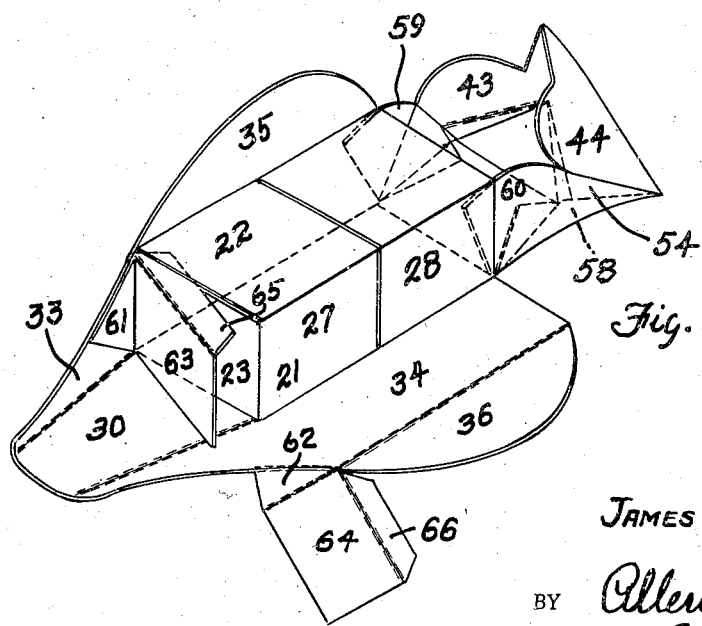
Figure 11 is a perspective view showing the owl figure in process of formation.

In erecting the head portion of the owl figure, the board is bent on all of the score lines hereinabove described. The bending of the board along score lines 45 to 49 results in the erection of the front part of the head and the bringing of the ears into upstanding position. The bending of the board along score lines 51 and 52 erects the side portions of the head while the bending of the board along score lines 55 and 56 brings the triangular tongues 57 and 58 in a position to close the otherwise open back ends of the ears. The bending over of the head structure along the score lines 38 and 40 brings the tongues 59 and 60 into a position to be inserted behind or beneath the top and bottom closure walls of the carton 28. The owl figure, in a partial stage of erection, is shown in Figure 11, from which these folding operations will be clear. The head portion is maintained in erected position by the engagement aforesaid of the tongues 59 and 60.

The interengagement of the tuck flaps 59 and 60 with the inner cartons should be sufficient to maintain the head in erected position. However, where the device is to be used as a decoy, and where it is feared that a high wind pressure might tend to blow the head back, I may provide on the cheeks or front face portions locking tongues, one of which is indicated at 67 in Figure 10, and a slit or combination of slits in the front wall members 35 and 36, as indicated at 68 in dotted lines. This will enable me to engage the front face portions positively with the front wall portions. It may be noted that in such a structure, if the bottom walls 63 and 64 are provided with an interlock (for example, such an interlock as is described in connection with the collar members 11 and 12 of the crow figure), the owl figure likewise would become self-sustaining in the absence of interior cartons.

Following my teachings herein, figures of a wide variety may be made from box board or other sheet material cut and bent in accordance with the principles set forth herein. The figure of the owl and the figure of the crow are exemplary merely. It is not necessary that the figures be formed on a base of cartons such as the indicated cartons 22, 27 and 28. The parts may be interengaged with themselves and may be held by adhesive, interlocks, applied tapes and the like. Needless to say, the sheet material from which the figures are formed may be printed or otherwise appropriately decorated.

Modifications may be made in my invention without departing from the spirit of it. Having thus described my invention, what I claim as new and desire to secure by Letters Patent is:

1. A blank of sheet material for the formation of a three dimensional figure, comprising in articulation a back body panel, side body panels articulated thereto, other panels articulated to the side body panels and adapted to be brought into substantial lapping relationship to form an under portion of the figure, said latter panels being provided with engagement means to maintain an erected condition of the body portion of the figure, the body back panel having an extension at one end to form a neck portion, head forming parts articulated to said neck portion and having means for engagement with body portion means whereby when the head is erected the neck forming portion is bent out of the plane of the body back panel and maintained rigidly with respect thereto.

2. The structure claimed in claim 1 in which said body back panel and the body side panels have tail-like extensions in articulation, the lines of articulation of said extensions being converging lines whereby when the structure is erected the tail extension on said body back panel is disposed to lie in a plane aslant to the plane of said body back panel.

3. The structure claimed in claim 1 in combination with at least one inner carton or body reinforcement, and in which the head forming parts at least have members for engagement with said carton.

4. The structure claimed in claim 1 in combination with at least one inner carton or body reinforcement, and in which the head forming parts at least have members for engagement with said carton, and in which the said panels forming an under portion of the figure also have means for engagement with said carton.

5. The structure claimed in claim 1 in combination with at least one inner carton or body reinforcement, in which the head forming parts at least have members for engagement with said carton, in which the said panels forming an under portion of the figure also have means for engagement with said carton, and in which there is a front body panel, said front body panel and a side body panel having means for inter-engagement with said carton.

6. A structure of the character described formed from sheet material and having in articulation parts for forming a three-dimensional body and a three-dimensional head, said sheet material being cut, scored and dimensioned to fold about an inner carton, at least one body forming part and one head forming part having tuck means for engagement with said inner carton.

7. In a structure of the character described, a blank of sheet material cut and scored to form an upright body having at least four walls, a tail portion having at least three walls integral with respective body walls and scored aslant so that the said tail portion inclines rearwardly from said bottom portion, and a head portion having at least three walls extending forwardly of said body portion, one of said walls at least being integral with a body wall, and means for maintaining the body walls in erected condition wherein they are angularly related to each other, whereby said tail portion is also maintained in erected condition.

8. In a structure of the class described, a cut and scored blank of flexible material having panels in articulation for forming a body portion with at least four walls, a head portion inclined forwardly from said body portion with at least three walls, and a tail portion inclined rearwardly from said body portion with at least three walls, certain of said several walls having means for engagement with an erected carton capable of being located within said body portion.

9. In a structure of the character described, a back panel, body side and front panels articulated thereto, means for holding said panels in erected relationship in which they are angularly related to each other, a back tail panel articulated to said back body panel, side tail panels articulated to said back tail panel on converging score lines, means for maintaining said panels in erected and angularly related condition, end portions of said side tail panels having engagement with end portions of said body side panels so that said erected tail panels incline rearwardly, and a head structure comprising a back head panel articulated to said back body panel, and at least two side head panels articulated to said back head panel, and means for maintaining said panels in erected and angularly related condition.

10. The structure claimed in claim 9 including a triangular top head panel articulated to said head back panel, and a plurality of additional panels articulated to each other and to said head top panel upon converging score lines whereby to produce a structure characterized by a pair of angularly related front face panels and upstanding ear-like configurations.

11. The structure claimed in claim 9 including a triangular top head panel articulated to said head back panel, and a plurality of additional panels articulated to each other and to said head top panel upon converging score lines whereby to produce a structure characterized by a pair of angularly related front face panels and upstanding ear-like configurations, and means on said front face panels for interlocking with a front body panel of said structure.

12. The structure claimed in claim 9 including a triangular top head panel articulated to said head back panel, and a plurality of additional panels articulated to each other and to said head top panel upon converging score lines whereby to produce a structure characterized by a pair of angularly related front face panels and upstanding ear-like configurations, and means on said front face panels for interlocking with a front body panel of said structure, said front face panels having additional panels articulated thereto laterally to form lateral back portions of the head and to close back portions of the said ear-like configurations.

13. In combination with at least one inner carton serving as a reinforcing structure, a blank of sheet material cut and scored to provide body panels capable of enclosing said carton on at least three sides, additional panels to form a rearwardly extending tail structure enclosed on at least three sides, and additional panels to form a three-dimensional head structure enclosed on at least three sides, the body, the tail and the head each being provided on certain panels with means for interengagement with said carton.

14. In combination with at least one inner carton serving as a reinforcing structure, a blank of sheet material cut and scored to provide body panels capable of enclosing said carton on at least three sides, additional panels to form a rearwardly extending tail structure enclosed on at least three sides, and additional panels to form a three-dimensional head structure enclosed on at least three sides, the tail structure having additional panels articulated thereto to form an under part for the structure, one at least of said panels having means for interengagement with said carton, and said head portion having also means for interengagement with said carton.

15. In combination with at least one inner carton serving as a reinforcing structure, a blank of sheet material cut and scored to provide body panels capable of enclosing said carton on at least three sides, additional panels to form a rearwardly extending tail structure enclosed on at least three sides, and additional panels to form a three-dimensional head structure enclosed on at least three sides, the tail structure having additional panels articulated thereto to form an under part for the structure, one at least of said panels having means for interengagement with said carton, and said head portion having also means for interengagement with said carton, said head portion also having means for interengagement with at least one body wall of said structure.

JAMES F. BUFFENBARGER.